United States Patent [19]

Katashima et al.

[11] Patent Number: 4,612,493
[45] Date of Patent: Sep. 16, 1986

[54] CONTROL DEVICE FOR CHARGING GENERATOR

[75] Inventors: Tadashi Katashima; Yoshiyuki Iwaki, both of Hyogo, Japan

[73] Assignee: Mitsubishi Denki Kabushik Kaisha, Tokyo, Japan

[21] Appl. No.: 608,288

[22] Filed: May 8, 1984

[30] Foreign Application Priority Data

Jun. 20, 1983 [JP] Japan ................... 58-96423[U]

[51] Int. Cl.⁴ ............................................. H02J 7/00
[52] U.S. Cl. ........................................ 320/64; 322/28; 323/274; 323/284
[58] Field of Search ............... 320/61, 64; 322/28, 322/72, 73; 323/274, 284

[56] References Cited

U.S. PATENT DOCUMENTS

Re. 24,671  7/1959  Jensen ..................... 323/284
3,560,840   2/1971  Stalp ....................... 322/28

FOREIGN PATENT DOCUMENTS 1162935   2/1964  Fed. Rep. of Germany .
1933808   6/1972  Fed. Rep. of Germany .
2725785  12/1977  Fed. Rep. of Germany .

Primary Examiner—Patrick R. Salce
Assistant Examiner—Anita M. Ault
Attorney, Agent, or Firm—Sughrue, Mion, Zinn, Macpeak & Seas

[57] ABSTRACT

A control device for an alternator which can be fabricated as a single hybrid integrated circuit. The output of the alternator which is to be used to drive the field coil of the generator is rectified, and the rectified voltage is voltage divided by two resistors, one of which has a smoothing capacitor connected in parallel therewith. A detection and amplification transistor amplifies the signal at the junction point of the resistors and applies the amplified signal through a Zener diode to the base of a control transistor, the latter driving a switching transistor which controls the amount of current passing through the field coil of the generator.

3 Claims, 2 Drawing Figures

CONTROL DEVICE FOR CHARGING GENERATOR

BACKGROUND OF THE INVENTION

The present invention relates to a control device for an AC charging generator (alternator) for vehicular use.

A conventional device of the same general type to which the invention pertains will be described with reference to FIG. 1. In FIG. 1, reference numeral 10 designates a generator, 1 designates a three-phase winding of a stator, 2 designates a field coil, 3 designates a rectifier, 31, 32 and 33 designate first, second and third rectifying output terminals, respectively, 4 designates a storage battery, 5 designates an indicator lamp, 6 designates a keyswitch, 7 designates a control device, 71 designates a switching transistor for switching a field current, 72 designates a control transistor for controlling the transistor 71, 73 designates a Zener diode used to detect an output voltage of the generator 10 which begins to conduct when the output voltage becomes higher than a predetermined value, 74 and 75 designate first and second resistors together constituting a voltage divider circuit, and 76 designates a smoothing capacitor. The control transistor 72 and the Zener diode 73 are formed on a monolithic chip.

The conventional device of FIG. 1 operates as follows. When the keyswitch 6 is closed, the current from the storage battery 4 flows through the keyswitch 6, the indicator light 5 and the field coil 2 causing the indicator lamp 5 to light and energizing the field coil 2. Next, when the engine (not shown) starts to drive the generator 10, a voltage is generated at the first and second output terminals 31 and 32. The voltage at the first output terminal 31 is used to charge the storage battery 4. Since the same voltage is generated at the second output terminal 32 as at the first output terminal 31, the voltages at the two terminals of the indicator lamp 5 are equal, and hence the indicator lamp 5 is extinguished. When the speed of the engine further increases such that the voltage at a junction point a of the resistors 74 and 75 exceeds the predetermined value, the Zener diode 73 becomes conductive. As a result, the control transistor 72 turns on and the switching transistor 71 is turned off. Thus, the current flow through the field coil 2 is interrupted. Accordingly, the amount of current passing through the field coil 2 is decreased and the voltage generated at the output terminals is also decreased. As a result, the Zener diode 73 again becomes nonconductive. Thus, the switching transistor 71 is turned on again and the generated voltage increased. By repeating the above operations, the output of the generator 10 is maintained at a predetermined voltage.

A ripple component is present in the output of this type of generator. The magnitude of the ripple component increases as the output current increases. Since the Zener diode 73 conducts or not depending on the peak amplitude of the ripple component, an output voltage indicator, which shows a mean value, indicates a different value from the maximum value. For the purpose of reducing this difference, the smoothing capacitor 76 is provided. However, so that the Zener diode 73 will operate properly, the resistance values of the resistors 74 and 75 cannot be increased. Thus, the capacitance of the capacitor 76 must be high. Accordingly, it is difficult to fabricate the conventional circuit in hybrid IC form.

SUMMARY OF THE INVENTION

In view of the drawbacks of the prior art described above, an object of the present invention is to provide a control device for a charging generator in which the capacitance of a capacitor provided for removing a ripple component is low so that the device can readily be fabricated in hybrid IC form.

In accordance with the above and other objects of the invention, there is provided a control device for a charging generator including means for rectifying an AC output at output terminals of the stator coils of the generator to produce a first DC output for charging a storage battery and a second DC output for driving a field coil of the generator, a switching transistor for controlling the amount of current passing through the field coil, a control transistor for controlling the switching transistor, first and second resistors forming a voltage divider for voltage dividing the second DC output, a capacitor connected between the junction point of the first and second resistors and a ground terminal of the rectifying means, a detection and amplification transistor having a base connected to the junction point of the first and second resistors, and a Zener diode connected between the emitter of the detection and amplification transistor and a base of the control transistor, which Zener diode becomes conductive when the second DC output is higher than a predetermined value. The detection and amplification transistor can be formed in a monolithic chip together with the Zener diode and control transistor.

DESCRIPTION OF THE PREFERRED EMBODIMENTS

Figure 1:
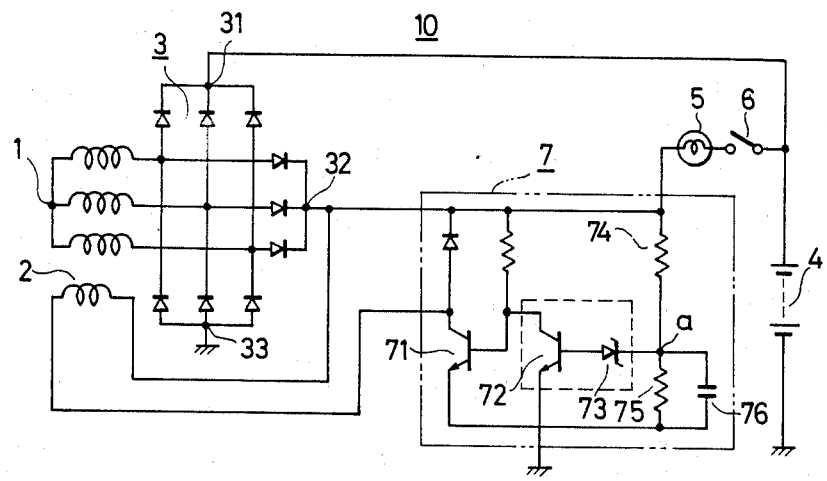
FIG. 1 is a circuit diagram of a charging generator employing a conventional control circuit.
Figure 2:
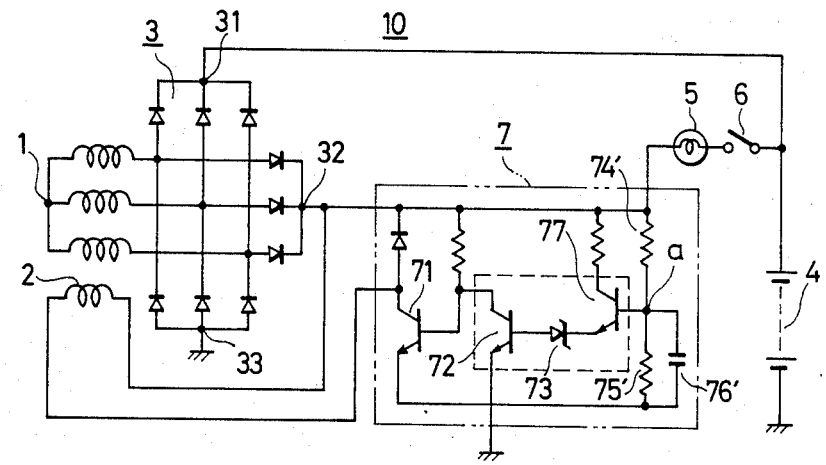
FIG. 2 is a circuit diagram showing a preferred embodiment of the present invention.

The present invention will now be described with reference to FIG. 2, wherein like reference numeral designate like or corresponding parts in FIG. 1. Reference numeral 77 designates a transistor. According to the embodiment of FIG. 2, the resistance values of the resistors 74' and 75' can be made higher than in the conventional circuit due to the current amplification of the transistor 77. The capacitance value of the capacitor 76' can be decreased in inverse proportion to the resistance values of the resistors 74' and 75'. Thus, the circuit is economical and can be constructed compactly in hybrid IC form. The transistor 77 is formed in a monolithic chip together with the Zener diode 73 and the transistor 72. Therefore, the size of the chip is almost the same as the prior art chip composed of the Zener diode 73 and the transistor 72, and thus the amount of labor required to produce the chip and its cost are about the same as in the prior art approach.

As described above, according to the present invention, the capacitance value of a capacitor used for removing a ripple component and stabilizing the operation of the Zener diode can be lowered. Accordingly, the control device of the present invention is economical and is easily constructed in hybird IC form.

We claim:

1. A control device for a charging generator, comprising:
   means for rectifying an alternating current output produced at output terminals of stator coils of said charging generator to produce a first DC output for charging a storage battery and a second DC output for driving a field coil of said generator;
   a switching transistor for controlling an amount of current passing through said field coil;
   a control transistor for controlling said switching transistor;
   first and second resistors forming a voltage divider for voltage dividing said second DC output produced by said rectifying means;
   a capacitor connected between a junction point of said first and second resistors and a ground terminal of said rectifying means;
   a detection and amplification transistor having a base connected to said junction point of said first and second resistors; and
   a Zener diode connected between an emitter of said detection and amplification transistor and a base of said control transistor, said Zener diode becoming conductive when said second DC output voltage is higher than a predetermined value, said control device being formed in a hybrid integrated circuit, said detection and amplification transistor being positioned within said control device such that a value of said capacitor may be lowered sufficiently to enable formation in said hybrid integrated circuit.

2. The control device as claimed in claim 1, wherein said detection and amplification transistor is formed in a monolithic chip together with said Zener diode and said control transistor.

3. The control device as claimed in claim 1, wherein a first current provided at an emitter of said detection and amplification transistor is a function of a current amplification factor of said detection and amplification transistor and a potential at said junction point, thereby permitting use of large resistors for said voltage divider and minimizing a capacitance value of said capacitor required to remove ripple components from a second current flowing through said Zener diode.

* * * * *